Nov. 13, 1962     B. DIERKS     3,063,580
PARKING APPARATUS

Filed June 15, 1959     3 Sheets-Sheet 1

Bernhard Dierks
INVENTOR

BY Ramsey and Kolisch
Attys.

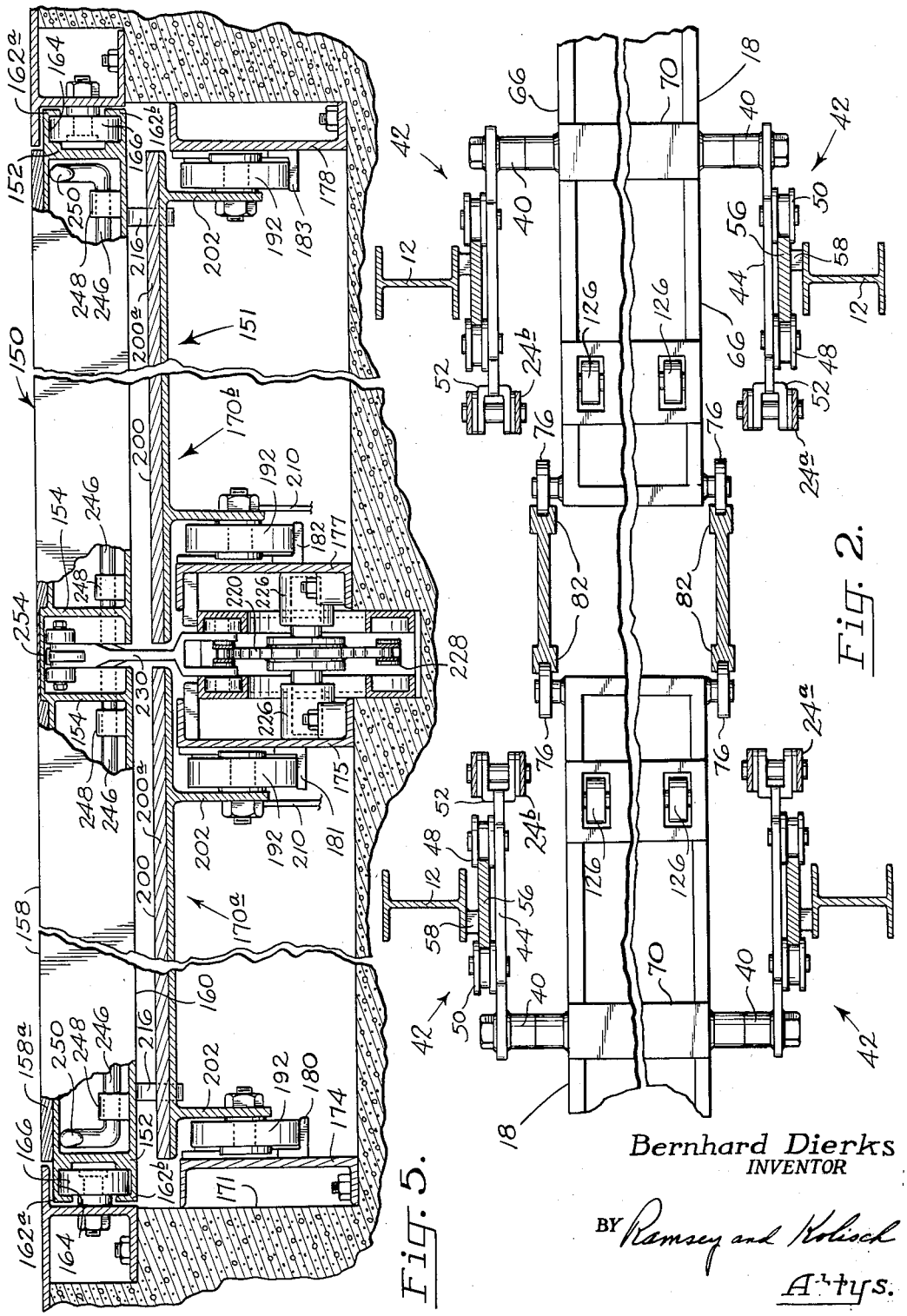

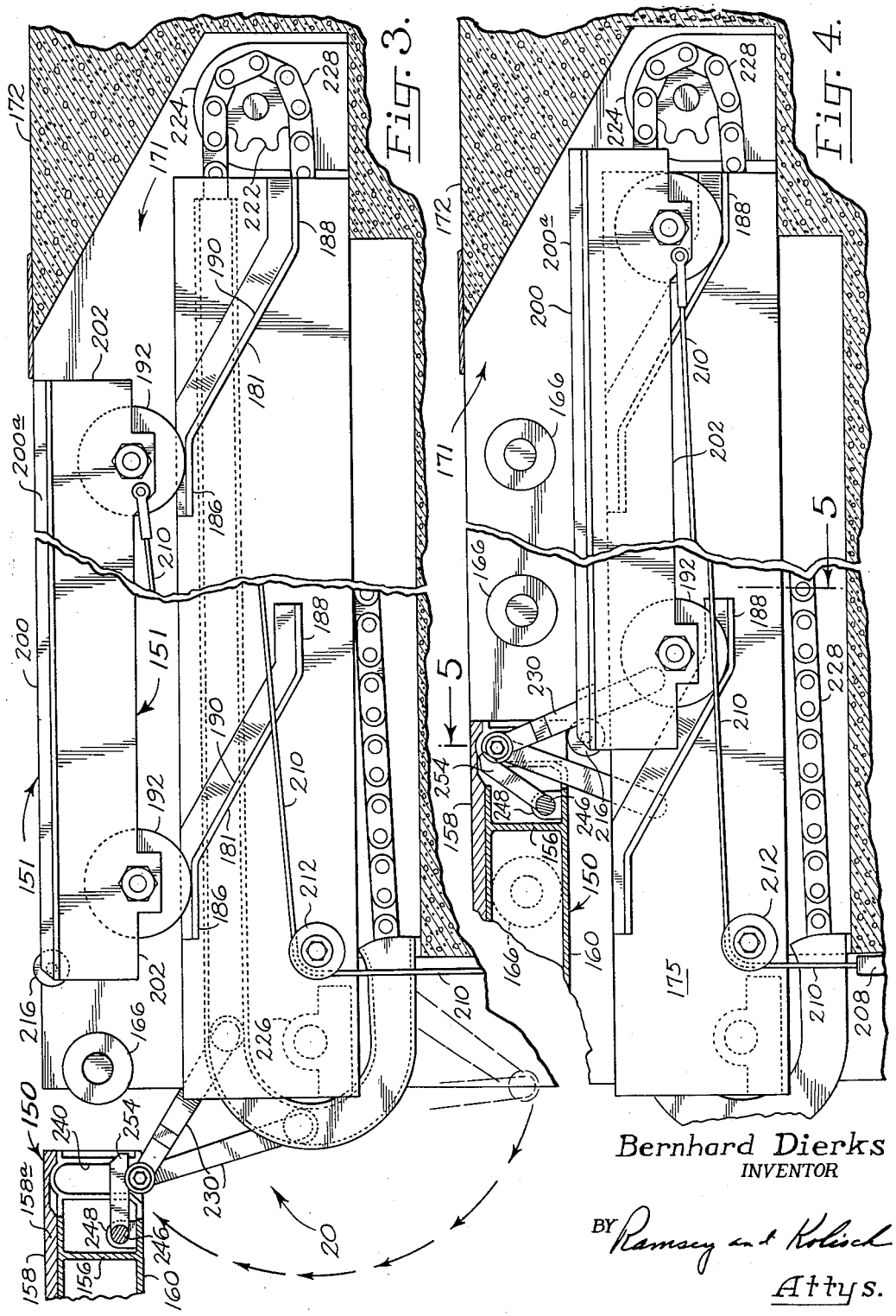

United States Patent Office 3,063,580
Patented Nov. 13, 1962

3,063,580
PARKING APPARATUS
Bernhard Dierks, Box 106, Grants Pass, Oreg.
Filed June 15, 1959, Ser. No. 820,196
8 Claims. (Cl. 214—16.1)

This invention relates to parking facilities, and more particularly to improved apparatus for parking automobiles one above the other in a building-like frame structure.

Urban parking has become an increasingly difficult problem. Increase in automobile traffic has made desirable the provision of greater parking facilities in a city. Discouraging the development of city parking areas, however, are the high real estate costs that prevail in a city. To make more parking space available at low cost, a need has arisen for parking facilities which stack cars one over another during storage, such type of apparatus handling a relatively large number of cars on a relatively small lot.

Stacked parking of cars may be done in a number of different ways. For instance, ramps may be provided to enable driving of cars from one story level to another. This type of construction results in large amounts of wasted space, however, and makes necessary drivers for the automobiles. Automobile storage apparatus based on a filing system and using a gantry crane for moving cars into different pockets has been developed, but such construction also results in waste space as room must be provided for movement of the crane. Further, since the crane handles cars in plural rows, loading and unloading of the parking apparatus is slow. An alternative type of construction is one which employs an endless upright conveyer with vertical runs and with car-carrying cradles spaced along the conveyer, and which includes mechanism for moving the conveyer to bring a selected cradle to the level required for loading and unloading of an automobile from the same. In such a system, a car once deposited on a car-carrying cradle of the conveyer usually remains there during storage. The system has the advantage of permitting efficient use of land area, since cars are stored in vertical rows and this is done without the need of providing an open way for the movement of any crane. In general terms, this invention concerns an improved automobile parking facility of the latter description, that is fast to operate, and accommodates maximum utilization of vertical space as well as land area for storage.

Briefly, the parking facility of this invention comprises an upright building frame and mounted therein one or more vertical, endless conveyer units with car-carrying cradles suspended thereon. The apparatus is constructed to enable the loading of an automobile on each of the cradles, without having to drive the automobile. Thus each of the cradles is provided with a car-carrying platform, which is completely removable from the cradle when placing a car on the platform, and which is returned to the cradle during storage of the automobile. A car is driven on or off a platform while the platform is positioned at a loading or reception station. Pickup mechanism is provided at the reception station for moving each platform on or off the cradle carrying the same. This enables the use of one pickup mechanism for all the car-carrying platforms of a single conveyer unit.

A driveway for automobiles leads to and away from the reception station. This driveway may be usable by all the automobiles serviced by a plural number of conveyer units arranged side by side. Thus the reception station is provided with loading platform means that in its lowered position accommodates a car-carrying platform with the top thereof at the level of the driveway, so that the upper surface of the car-carrying platform forms a continuation of the driveway. In this condition, the reception station is ready to receive for loading a car, and also positioned to enable movement of cars from other units thereacross. When a car-carrying platform is moved out of the loading station and back onto a cradle, the loading platform means may be raised to an elevated position, wherein the upper surface thereof is flush with the driveway and forms a continuation of the driveway. In this position, the top surface of the platform means accommodates movement of cars from other units over the driveway and across the reception station.

A more specific object of this invention, therefore, is to provide improved mechanism for parking automobiles wherein such mechanism comprises an endless upright conveyer supporting car-carrying cradles, and wherein the construction also comprises a car-carrying platform for each of the cradles completely removable therefrom and improved mechanism for moving these platforms on and off the cradles and for supporting the platforms in the driveway for the apparatus when they are off the cradles.

Another object is to provide improved means for locking a car-carrying platform on its cradle, and for releasing the platform and moving the same off its cradle prior to unloading or loading.

In parking apparatus that employs an endless, upright conveyer with car-carrying cradles supported thereon, it is necessary that the cradles be allowed to pivot relative to the conveyer so that when that portion of the conveyer mounting a cradle moves over a sprocket at the end of a vertical run, the cradle will remain upright. A pivotally mounted cradle, if not stabilized, would tend to swing to various positions relative to the conveyer after loading, depending upon how the load it carries is balanced. This makes for clearance problems. Also, during movement of the conveyer, freely swingable cradles would be disadvantageous. It is an object of this invention, therefore, to provide improved means for steadying the cradles as they are carried along by the endless conveyer that is operable to hold the cradles from swinging movement in substantially all directions, and thus operable to make the cradles completely stable at all times.

A more specific object of the invention is to provide improved mechanism for steadying each of the car-carrying cradles as it is carried by the conveyer over the sprockets disposed between the endless vertical runs thereof. Such mechanism is constructed to accommodate necessary vertical and horizontal movement in any cradle during these transitional periods when the cradle is disposed intermediate the vertical runs, but to prevent the cradles from any tilting during these periods.

Another specific object and feature is the provision of means for guiding the cradles as they move both vertically and across the building frame structure on movement of the endless conveyer.

Other features, objects and advantages of the invention will become apparent from reading the following description, wherein an embodiment of the invention is disclosed, such description being with reference to the accompanying drawings, wherein:

FIG. 2 is an enlarged view of the top of a pair of car-carrying cradles, slightly enlarged, and generally along the line 2—2 in FIG. 1;

FIG. 3 is an enlarged view of the loading platform means present in the reception station;

FIG. 4 shows the platform means of FIG. 3 in a lowered position;

FIG. 5 is a section view along the line 5—5 in FIG. 4; and

Figures 1, 6:
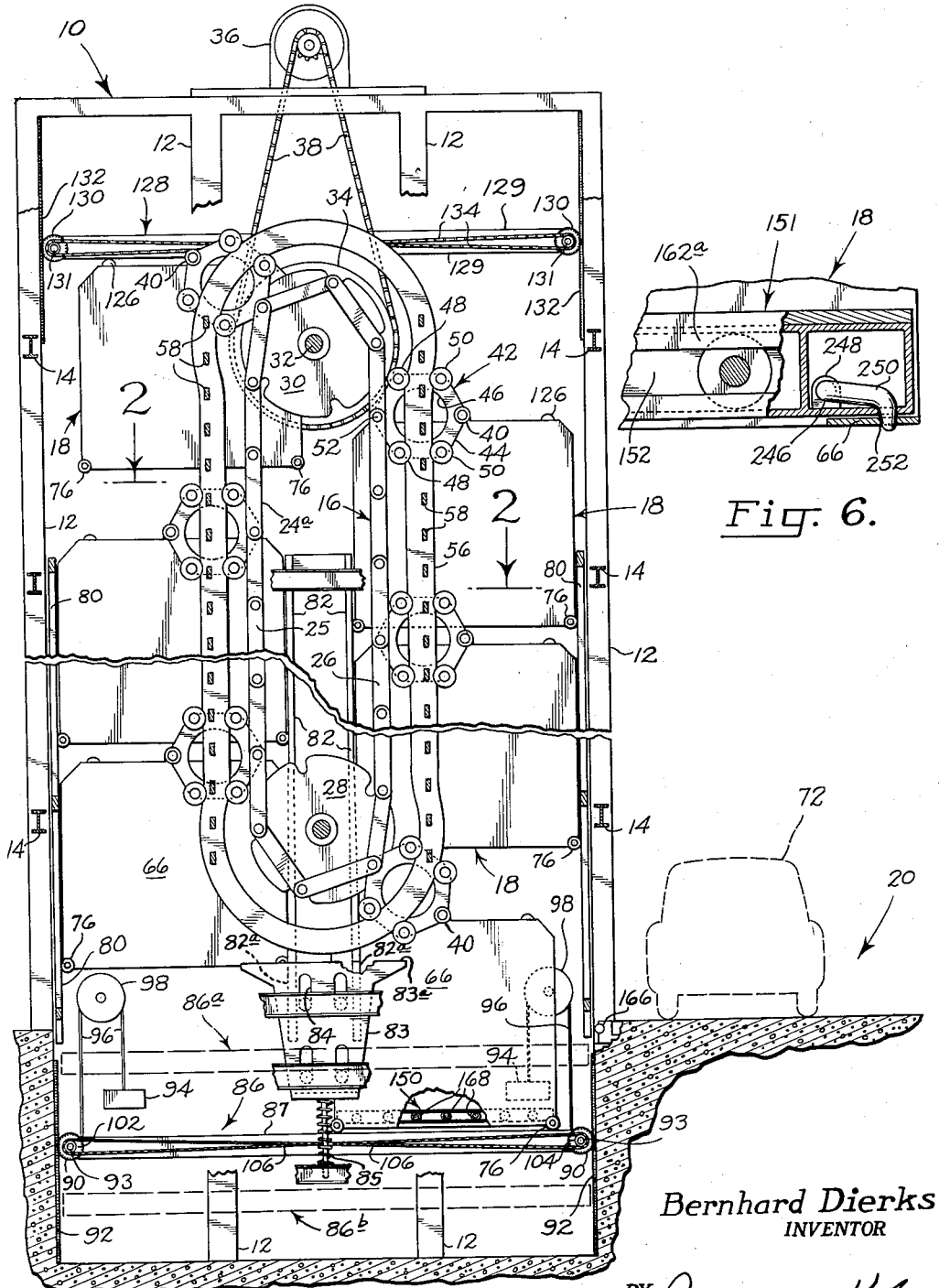
FIG. 1 is a side elevation of one unit of a parking facility constructed according to this invention, with parts of the frame structure removed to illustrate details.
FIG. 6 is a side view with parts shown of portions of a car-carrying platform while occupying a cradle.

Referring now to the drawings, and with special reference to FIG. 1, 10 indicates generally a vertical, rigid, building-frame structure comprising vertical, rigid columns 12 and transverse girders 14 suitably secured together to provide a structural framework in the apparatus. Mounted within the frame structure is an elongated, endless conveyer indicated generally at 16. The conveyer has pivotally carried thereon plural car-carrying cradles 18 spaced along the length thereof. As will become hereinafter apparent, on movement of the conveyer the cradles shift either upwardly, across or downwardly in the frame, along a closed path. Thus the parking facility may be designated as a "merry-go-round" type of structure, with cradles moving on movement of the conveyer successively first into and then away from a position adjacent a reception or loading station, indicated generally at 20, where cars are loaded and unloaded from the unit. Only one parking unit is illustrated; however, it should be understood that a complete parking facility may comprise plural units disposed side by side and each having a conveyer such as conveyer 16 and each handling a separate vertical stock of automobiles. As described hereinbelow, the construction is characterized by novel mechanism which allows the automobiles of several units to move over a common driveway when moving into and out of the apparatus.

Considering now the construction of conveyer 16, and referring now more particularly to FIGS. 1 and 2, the conveyer comprises a pair of endless carrier belts or chain belts 24a, 24b (one of which is obscured in FIG. 1) set side by side and in parallel planes and aligned with each other in a lateral direction. These are spaced apart so as to accommodate mounting of the car-carrying cradles between the chain belts. Each of the carrier or chain belts has opposed vertical runs, indicated at 25 and 26, that extend parallel to each other. Portions of each carrier belt at the ends of its runs 25, 26 are trained over enlarged sprockets, indicated at 30 and 28, located near the top and bottom of the frame, respectively. Provision is made for rotating the two chains of a conveyer unit conjointly. Thus, in the embodiment illustrated, interconnecting each sprocket 30 at the top of the conveyer is a shaft 32. Also a part of shaft 32 and secured thereto is a drive sprocket 34. A motor 36 mounted on the top of frame structure 10 is operable when actuated to move a drive chain 38 trained over drive sprocket 34. The motor preferably is reversible, to enable rotation of shaft 32 in either of opposite directions. Thus any cradle 18 may be moved directly to reception station 20 while moving over the shortest route.

Referring again to FIGS. 1 and 2, rotatably secured to the top and on opposite sides of each cradle 18, at points midway between the cradle's inner and outer extremities, and by pivot connections 40, are followers indicated generally at 42. Each follower 42, as shown, takes the form of a hexagon plate 44, hollowed out at 46 to reduce weight, and rotatably mounting at the corners thereof sets of rollers 48, 50. Plate 44 is rotatably secured at 52 to a chain belt. The sets of rolls 48, 50 of each follower ride over opposite side edges of an elongated, continuous guide rail 56. One of such guide rails is mounted concentrically with each carrier belt. The guide rails are secured to the frame 10 by spacers 58, that are shown in section in FIG. 1 since parts of frame 10 are removed in FIG. 1. The profile of each guide rail is substantially the same as the profile of a carrier belt, and thus each curves at the top and bottom of the frame about axes coincident with the rotation axes of the sprockets, and intermediate the top and bottom of the frame extends in straight reaches parallel to the runs of the carrier belt associated therewith. The guide rails and followers serve to define a path of movement for the various car-carrying cradles which has an outline substantially the same as the profile of a carrier belt.

The mounting of the followers with a car-carrying cradle is important. Since the connections 40 are substantially centrally between inner and outer extremities of the cradle, each cradle balances itself in a horizontal position below its associated follower. Further, since the connections 40 are spaced outwardly from the carrier belts, it will be seen that stepped-up movement is imparted to a cradle as it moves from one set of vertical runs for the carrier belts of the conveyer to the other. This is by reason of the fact that the connections 40 move through arcs of larger radius than the radius of the sprockets when they sweep from one set of vertical runs to the other. The step-up in movement of the cradles at the ends of the belt runs is highly advantageous, as it permits closer spacing of the cradles without the cradles becoming encumbered with one another as they shift laterally at the top and bottom of the frame.

Referring again to FIGS. 1 and 2, each of the car-carrying cradles 18 comprises sides 66 and extending between the sides 66 strengtheners 70. The cradles are of a size sufficient to receive an automobile with the automobile extending lengthwise between the sides 66. This is so since automobiles are loaded onto a cradle by first driving the automobile to a position where it extends parallel to a side of frame 10, as illustrated by the dotted outline for an automobile 72 in FIG. 1. At the base of each cradle and at each of its corners is a roller or runner 76. The rollers 76 have the double function of forming part of a leveler means for holding a cradle in a horizontal plane when it is shifted between the vertical runs of the carrier belts, and also serving as a means steadying the cradle from swinging during movement up or down in a vertical direction.

During vertical movement of a cradle, rollers 76 travel between the side flanges of elongated outer guides 80 provided adjacent the sides of frame 10 and elongated inner guides 82 provided near the center of the frame. The rollers, by riding in these guides, inhibit tilting of the cradle and side to side shifting thereof. When a cradle nears the bottom of frame 10 and prepares to shift from one set of belt runs to the other, rollers 76 move free of guides 80 and 82 and come into contact with a support means, indicated generally at 86. This constitutes another portion of the leveler means. Guides 80, 82 steady a cradle until substantially the time it starts moving in a curving lateral sweep between the vertical runs of chains 24a, 24b. Thus the bottoms of the guides extend a considerable distance below the bases of rails 56. To accommodate movement of connections 40 across the positions of inner guides 82 when a cradle is moved laterally at the base of frame 10, guides 82 are provided with separable portions 82a mounted on a positioner plate 83 and having an upper edge 83a positioned to engage a connection 40 when the same moves toward plate 83. Plate 83 is vertically movable, and guided during vertical movement by pin and slots 84. The plate is urged upwardly to a position wherein portions 82a meet the remainder of guides 82 by a spring 85. In operation, a cradle moves downwardly and across frame 10 with connection 40 contacting edge 83a and causing plate 83 to shift downwardly. This separates portions 82a, while the connection 40 moves across guides 82. On leaving edge 83a, portions 82a move back to the position shown in FIG. 1.

In the embodiment illustrated, the support means 86 takes the form of a pair of laterally spaced and parallel beams or structures 87 (one of which is obscured in FIG. 1) mounted one along one side and one along the other side of the path of a cradle thereover. The beams or structures are mounted for limited vertical movement, enabling the support means to move between the positions indicated in dotted outline at 86a and 86b. In the raised position 86a, the support means is in position to come into contact with rollers 76 of a cradle when the cradle occupies a position adjacent loading station 20, and with the cradle held by the conveyer at the end of a vertical run. In the lowered position 86b, the support means has followed the rollers 76 of a cradle to their lowest position in the frame.

The mounting for the support means includes pinion gears 90 at the ends of each beam 87 which mesh with the teeth of racks 92 secured to frame 10. The pinion gears 90 at adjacent ends of beam 87 are joined together by shafts 93. Movement of the support means 86 is accompanied by rotation of pinion gears 90. The support means normally rests in the upper position indicated at 86a, and downward movement of the support means from this position is yieldably resisted by counterweights 94 connected to the support by lines 96, the latter being trained over pulleys 98. The support means is prevented from end tilting, and thus tilting from the horizontal position of FIG. 1, by mechanism interconnecting pinion gears 90 at opposite ends of the support that limit the gears to simultaneous rotation. Thus the pinions at the left of the support in FIG. 1 are affixed through shaft 93 to a sprocket 102. The pinions at the right of the support are secured in a similar manner to a sprocket 104. A chain 106 is trained over sprockets 102, 104, and this chain constrains the sprockets so that both must rotate together. The leveler means steadies a cradle from tilting about the horizontal pivot axis afforded the cradle by connections 40 (such pivot axes being perpendicular to the planes of carrier belts 24a, 24b) by engaging ends of the cradle disposed on opposite sides of this pivot axis.

A set of rollers 126 mounted at the four corners of each cradle at the top of the cradle are used to steady the cradle when it moves from one set of runs of the carrier belts to the other at the top of the frame structure, in a manner similar to rollers 76. These rollers 126 are set inwardly on a cradle from rollers 76, and are part of another leveler means. Rollers 126 come into contact with a second support means 128 (another portion of the leveler means) at the top of the frame structure when the cradle mounting the same nears the top of the frame and rollers 76 leave guides 80, 82. Support means 128 is parallel to support means 86, and is made up of a pair of beams 129 similar to beams 87. Like beams 87, beams 129 are free to move in a vertical direction but are constrained from tilting from the horizontal position shown in FIG. 1. Thus each of the beams rotatably mounts at its ends pinions 130 that mesh with the teeth of racks 132 secured to frame 10. The pinions at adjacent ends of beams 129 are connected by shafts 131. Sprockets and a chain 134 connect the pinions so that they can only rotate together. The weight of the upper support urges it to its normal rest position, which is a lowered position adjacent the ends of racks 132, and the support is yieldable upwardly from this position against the force of gravity when a cradle 18 is moved upwardly thereagainst.

For loading an automobile onto a cradle, a car-carrying platform is provided each cradle indicated in FIG. 1 at 150. Each car-carrying platform is completely removable from the cradle which carries the same. To deposit a car on a platform, the platform is first moved onto loading platform means provided loading or reception station 20, indicated generally at 151.

Specifically, and now referring to FIGS. 1, 3, 4 and 5, each car-carrying platform 151 comprises a rectangular, relatively thin, boxlike structure made up of side beams 152, internal strengtheners 154 parallel to the side beams, and cross beams 156 suitably secured together to form a skeleton frame for the platform. Over the top and bottom of the platform is top and bottom surfacing 158, 160, respectively. Top surfacing 158 may include cover material 158a to increase traction afforded vehicles driving thereover. Along those sides of the car-carrying platform that move adjacent sides 66 of a cradle 18 when the platform is moved thereon are provided turned-over top and bottom flanges, indicated at 162a and 162b, respectively. These, together with beams 152, define elongated guide channels, designated at 164, extending one along each side of the platform. These channels function to guide a platform during movement between the reception or loading station and a car-carrying cradle.

In the reception station a car-carrying platform is supported on a set of rollers 166 (see FIGS. 4 and 5), constituting guide means for guiding the car-carrying platform with loading platform means 151 in its lowered position. When located on a car-carrying cradle, the platform is supported on a set of rollers 168 (see FIG. 1). Prior to shifting a platform between a car-carrying cradle and the loading station, the cradle is first positioned at a height wherein rollers 168 align themselves with rollers 166. This enables the platform to be shifted either on or off a cradle with the channels along the sides thereof moving from one set of rollers onto the other set.

Considering now the loading platform means 151, this comprises a pair of platform sections 170a, 170b (see FIG. 5) mounted so that they may move between a raised position illustrated in FIG. 3 and a lowered position illustrated in FIG. 4. Movement occurs under the urging of a car-carrying platform moving over the platform sections and the construction illustrated makes unnecessary the provision of any power-actuated mechanism to produce shifting of the platform sections. Thus a well space 171 is provided in driveway 172 of the parking unit for receiving the loading platform means, and this well space has along its sides and along a central portion thereof channel beams indicated at 174, 175, 177 and 178. These are secured in fixed position in the well space, and extend in the direction of movement of the car-carrying platforms when they move into or out of the reception station 20. Each of the channel beams 174, 175, has secured along the side thereof that faces the other of the beams paired angle iron guides, indicated at 180 for beam 174 and 181 for beam 175. Similarly, channel beams 177, 178 have secured along the sides of these beams that face each other paired angle iron guides 182, 183.

The profile of these various angle iron guides is similar. Thus each angle iron guide has a raised portion indicated at 186, a bottom portion indicated at 188, and a sloping portion 190 connecting the raised and bottom portions. The angle iron guides support and guide the movement of wheels 192 provided the two platform sections 170a, 170b.

The platform sections 170a, 170b have similar construction. Each comprises a top 200 provided with traction promoting cover material 200a. Side flanges 202 extend along opposite sides of each platform section. Wheels 192 are rotatably mounted at the ends of these flanges. In the position of the platform sections illustrated in FIG. 3, wheels 192 rest on raised portions 186 and thus operate to support the platform sections with the tops thereof at driveway level. In the lowered position for the platform sections shown in FIG. 4, wheels 192 ride on portions 188 and operate to position tops 200 of the platform sections below the level of the driveway a distance equal to about the thickness of a car-carrying platform.

The two platform sections normally occupy the position shown in FIG. 3. The platform sections are urged to this position by means of counterweights or gravity-actuated means 208 secured through flexible lines 210 to the side flanges 202 of the platform sections. These lines 210 are trained over pulleys 212. With the counterweights in their lowermost positions, the platform sections are positioned forwardly and in their raised position. When the platform sections move to a position wherein wheels 192 move onto sloping portions 190 of the angle iron guides, a downward thrust exerted on the platform sections operates to move them downwardly and to the rear of well 171 with raising of the counterweights.

Near the top and at the forward end of each platform section is a small roller 216. These rollers are positioned to engage a car-carrying platform 151 when the latter initially moves off a cradle and into loading station 20. After a platform 151 comes into contact with rollers 216, continued movement of the car-carrying platform urges the platform sections rearwardly with the wheels 192 then moving onto sloping portions 190 to permit lowering of the platform sections. The rollers at this time ride under bottom surface 160 while the car-carrying platform moves to a position fully in loading station 20. The construction described permits lowering of the platform sections under the weight of a car-carrying platform and provides support sufficient to hold the platform sections in a raised position when a car is driven thereover.

With the two platform sections in their lowered positions and with a car-carrying platform supported thereover, the top of the car-carrying platform is flush with driveway 172. Thus in this position, cars may pass from adjacent parking units and drive from the driveway and over the car-carrying platform on their way in or out of the parking facility. With the car-carrying platform returned to a cradle, and the platform sections occupying the raised positions of FIG. 3, the tops of the platform sections are flush with driveway 172. In this condition the platform sections themselves serve as a continuation of the driveway. The provision of such loading platform means is important in reducing the space that must be allotted to provide for suitable access to adjacent units.

Referring now again to FIGS. 3, 4 and 5, a loading-unloading mechanism is provided the reception station for pulling off and returning a car-carrying platform from its respective cradle. Thus mounted in the well 171 that accommodates the elevator platform means, and between channel beams 175, 177 are a pair of sprockets, indicated at 220, 222. Sprocket 222 is secured to the drive shaft of a motor 224, whereas sprocket 220 is journaled in bearings 226 at the forward end of the station. Trained over the sprocket is a pickup chain 228. The chain has secured thereto pickup lug means 230. The pickup lug is engageable with a catch or slot provided each car-carrying platform intermediate internal strengtheners 154, such catch being indicated at 240 (see FIG. 3), when the lug means moves up and over sprocket 220 toward a position in the upper run of chain 224. The lug means holds a car-carrying platform stationary when the platform is finally positioned in the unloading station. In returning a car-carrying platform to a cradle, chain 228 is moved so that its upper run moves from right to left in FIGS. 3 and 4, the lug means when moved in this direction finally leaving catch 240, and thence moving to a position out of the way and below the sprocket 220, as indicated by the dotted outline for the lug means in FIG. 3.

A locking mechanism is also provided each car-carrying platform for locking the same to the base of its cradle. Referring now to FIGS. 5 and 6, in the embodiment illustrated this locking mechanism takes the form of an elongated shaft 246 disposed along the end of the car-carrying platform that is nearest the loading station 20 with the platform occupying a cradle. This shaft is journaled in bearings 248. Thus it constitutes a pivoted locking member. The shaft has turned-over ends 250 which project into recesses 252 provided in the base of a cradle to lock a car-carrying platform in fixed position on the cradle with the shaft in the position shown in FIG. 6, this position being a hold position. An intermediate portion of shaft 246 has projecting therefrom a lifting or release arm 254 which projects outwardly from the shaft with the shaft in the position of FIGS. 3 and 6, and closes off the mouth of catch 240. Lifting arm 254 is in position to be engaged by pickup lug means 230 of chain 228 when the lug means is moved in a direction to cause unloading of a car-carrying platform. When the lifting arm is engaged by lug means 230, the nonpivoted end of the arm is raised with rotation of shaft 246 to its release position and movement of ends 250 out of recesses 252. Thus arm 254 operatively interconnects operation of catch 240 and the locking mechanism.

While there has been described hereinabove an embodiment of the invention, it is appreciated that changes in the structural arrangement and/or the various parts and their organization will suggest themselves to those familiar with the art. It is desired not to be limited to the specific embodiment shown, but to cover all modifications and variations that would be apparent to one skilled in the art and that come within the scope of the appended claims.

It is claimed and desired to secure by Letters Patent:

1. In automobile parking apparatus, the combination of a vertical, multi-level building frame, an endless conveyer mounted in an upright position in said frame having vertical runs, car-carrying cradles pivotally secured to said conveyer spaced at intervals therealong, each of said cradles having a removable car-carrying platform mounted therein, each of the latter platforms being constructed to transport an automobile into a cradle, a reception station for holding an automobile prior to loading of the same located adjacent a vertical run of the conveyer, and a driveway for automobiles leading to and away from the reception station, said reception station including a loading platform having a supporting upper surface, means mounting the loading platform for movement of the same between a raised position wherein the upper surface thereof is at driveway level and a lowered position wherein the upper surface is below driveway level a distance equal substantially to the thickness of a car-carrying platform, and counterweight means for shifting the loading platform to its raised position from its lowered position.

2. Car parking apparatus comprising a vertical building frame, at least one, elongated and continuous carrier belt mounted on the frame having opposed vertical runs and trained over sprockets at the ends of the runs, one near the top and one near the bottom of the frame, plural car-carrying cradles pivotally mounted on the carrier belt and spaced therealong, a car-carrying platform mounted in each of the car-carrying cradles and removable from the same, a reception station adjacent the path of the car-carrying cradles as they move with the carrier belt, a driveway leading to and from the reception station, loading platform means included in the reception station movable between raised and lowered positions, said loading platform means in a lowered position being spaced to receive a car-carrying platform mounted over the loading platform means with the top of the car-carrying platform at driveway level and in a raised position forming a continuation of the driveway, a pivoted locking member mounted on each car-carrying platform shiftable between a locking position wherein the locking member locks the car-carrying platform in position on a cradle and a release position wherein the car-carrying platform is free to move off its cradle, unloading mechanism mounted at the reception station including lug means actuatable to engage the locking member of a car-carrying cradle and after engagement of the locking member to move the member to a release position, said lug means also operating when actuated to shift the car-carrying platform having the locking member from its cradle over said loading platform means with the latter in its lowered position.

3. In parking apparatus having car-carrying cradles movable past an automobile loading station, each of the car-carrying cradles having a removable car-carrying platform supported thereon, unloading mechanism mounted at the loading station for removing a car-carrying platform from its cradle, said unloading mechanism comprising a continuous chain having a horizontal run and a pickup lug mounted on the chain and movable therewith, a catch provided for each of the car-carrying platforms, said lug engaging said catch when the lug occupies a position adjacent a car-carrying cradle, locking means for each car-carrying platform for locking the platform to its cradle, and a release arm for each car-carrying platform adjacent its catch and connected to its said locking means, said release arm being adjusted by said lug to a position releasing the locking means connected thereto when the lug moves toward said catch to move a car-carrying platform off its cradle.

4. In automobile parking apparatus, the combination of a multi-level building frame having vertically shiftable elevator means mounted therein for moving automobiles, a car-carrying platform movable onto and off of said elevator means, a driveway for automobiles, and a reception station for holding an automobile prior to loading of the same on said elevator means positioned adjacent said elevator means with said driveway leading thereto, said reception station including loading platform means, means mounting said platform means for movement between a raised position where it occupies substantially the level of said driveway and forms a continuation thereof and a lowered position where it is spaced below said driveway, and means for guiding said car-carrying platform over said loading platform means with the latter in its lowered position.

5. The parking apparatus of claim 4, wherein there is further provided gravity-actuated means operatively connected to said loading platform means operable yieldably to urge said loading platform means to its said raised position, and means is provided supporting said loading platform means in its raised position from movement downwardly under the weight of an automobile.

6. In automobile parking apparatus, the combination of a multi-level building frame having vertically shiftable elevator means mounted therein for moving automobiles, a car-carrying platform movable onto and off of said elevator means, a driveway for automobiles, and a reception station for holding an automobile prior to loading of the same on said elevator means positioned adjacent said elevator means with said driveway for automobiles leading thereto, said reception station including loading platform means, means mounting said platform means for movement between a raised position wherein it occupies substantially the level of said driveway and a lowered position where it is spaced below said driveway, and means connected to said loading platform means yieldably holding it in its said raised position.

7. In an automobile parking apparatus, the combination of a multi-level building frame having an elevator mounted therein for moving automobiles, a driveway for automobiles, a reception station for holding an automobile prior to loading of the same on said elevator positioned adjacent said elevator with said driveway for automobiles connecting therewith, and a car-carrying platform movable off of said elevator into said reception station, said reception station including loading platform means, support means for said loading platform means for holding it in a raised and an automobile-supporting position and with the top thereof flush with said driveway, means defining a lowered position for said loading platform means where the top thereof is below said driveway, and means for guiding said loading platform means from its said raised to its said lowered position, movement of said loading platform between its two said positions being powered by shifting of said car-carrying platform off of said elevator into said reception station.

8. In apparatus for parking automobiles; a reception station for holding an automobile prior to its being parked; a car-carrying platform; means mounting said platform for movement to a position adjacent said reception station; and unloading means in said reception station for removing said car-carrying platform from the means mounting it and shifting said platform into said reception station; said unloading means comprising a continuous pickup chain mounted in said reception station for movement in a continuous path and including a run extending substantially parallel to the movement of said car-carrying platform into said reception station, and lug means mounted on said chain and projecting outwardly therefrom and movable with said chain in its path; said car-carrying platform including catch means engaged by said lug means during movement of said chain in said path and operable when engaged to connect the lug means and platform for movement together, and a locking member with a portion thereof engaged by said lug means on movement of said lug means toward said catch means; said locking member including another portion operable to lock said car-carrying platform on the means mounting the platform and that releases the two upon engagement by said lug means.

References Cited in the file of this patent
UNITED STATES PATENTS

| | | |
|---|---|---|
| 1,605,220 | Cuvillier et al. | Nov. 2, 1926 |
| 1,799,924 | Muzyn | Apr. 7, 1931 |
| 1,819,513 | James | Aug. 18, 1931 |
| 1,830,740 | Leech et al. | Nov. 3, 1931 |
| 1,870,046 | Goddard | Aug. 2, 1932 |
| 1,907,971 | James | May 9, 1933 |
| 1,984,685 | Marcy | Dec. 18, 1934 |
| 1,998,290 | Schraeder | Apr. 16, 1935 |
| 2,569,393 | Walker | Sept. 25, 1951 |
| 2,626,721 | Lodge et al. | Jan. 27, 1953 |
| 2,704,609 | Zeckendorf et al. | Mar. 22, 1955 |
| 2,712,875 | Leopold | July 12, 1955 |
| 2,741,384 | Duval et al. | Apr. 10, 1956 |

FOREIGN PATENTS

| | | |
|---|---|---|
| 711,820 | Germany | Oct. 7, 1941 |